(12) United States Patent
Lee

(10) Patent No.: US 8,026,994 B2
(45) Date of Patent: Sep. 27, 2011

(54) LIQUID CRYSTAL DISPLAY DEVICE HAVING MEMBERS FOR PREVENTING SHIFTING OF THE LIGHT GUIDE PLATE AND METHOD OF ASSEMBLING THE SAME

(75) Inventor: Sook Jin Lee, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 613 days.

(21) Appl. No.: 11/641,780

(22) Filed: Dec. 20, 2006

(65) Prior Publication Data
US 2007/0195225 A1   Aug. 23, 2007

(30) Foreign Application Priority Data
Feb. 20, 2006   (KR) .................. 10-2006-0016108

(51) Int. Cl.
*G02F 1/1333* (2006.01)
*G02F 1/1335* (2006.01)

(52) U.S. Cl. ............ 349/58; 349/61; 362/632; 362/633; 362/634

(58) Field of Classification Search .................. 349/58, 349/61; 362/632, 633, 634
See application file for complete search history.

(56) References Cited

U.S. PATENT DOCUMENTS

| | | | | |
|---|---|---|---|---|
| 6,166,788 A * | 12/2000 | Ha et al. | ............................ | 349/58 |
| 6,854,856 B2 | 2/2005 | Shin et al. | ........................ | 362/31 |
| 6,894,738 B2 | 5/2005 | Kasuga | ............................ | 349/58 |
| 7,083,318 B2 * | 8/2006 | Ha et al. | ........................ | 362/633 |
| 7,092,048 B2 | 8/2006 | Jeong | ............................... | 349/58 |
| 2002/0051102 A1 * | 5/2002 | Kuroki et al. | .................... | 349/58 |
| 2003/0016313 A1 * | 1/2003 | Jeong | ............................... | 349/58 |
| 2003/0043314 A1 * | 3/2003 | Lee et al. | ......................... | 349/65 |
| 2007/0166961 A1 | 7/2007 | Sumitomo et al. | ............ | 438/478 |

FOREIGN PATENT DOCUMENTS

| | | |
|---|---|---|
| JP | 1068826 | 3/1989 |
| JP | 2002149082 | 5/2002 |
| JP | 2002258249 | 9/2002 |
| JP | 2003-043456 | 2/2003 |
| JP | 2003346533 | 12/2003 |
| JP | 2004192912 | 7/2004 |
| JP | 2007194390 | 7/2007 |
| JP | 2007223953 | 9/2007 |

* cited by examiner

*Primary Examiner* — Michael H Caley
(74) *Attorney, Agent, or Firm* — Morgan, Lewis & Bockius LLP

(57) ABSTRACT

A liquid crystal display device includes a liquid crystal panel; a backlight unit to provide a light to the liquid crystal panel, the backlight unit includes an optical sheet and a light guide plate; and a main support to receive the liquid crystal panel and the backlight unit together, the main support having first and second movement preventing members to prevent shifting of the optical sheet and the light guide plate of the backlight unit in a direction on a plane, and a third movement preventing member to prevent shifting of the light guide plate of the backlight unit in a direction normal to the plane.

9 Claims, 10 Drawing Sheets

LIQUID CRYSTAL DISPLAY DEVICE HAVING MEMBERS FOR PREVENTING SHIFTING OF THE LIGHT GUIDE PLATE AND METHOD OF ASSEMBLING THE SAME This application claims the benefit of the Korean Patent Application No. 16108/2006 filed on Feb. 20, 2006 which is hereby incorporated by reference.

BACKGROUND OF THE INVENTION

1. Field of the Invention

The present invention relates to a liquid crystal display device, and more particularly, to a liquid crystal display device and method of assembling the same that enhances the device assembly process and decreases the manufacturing costs by forming an integral main support.

2. Discussion of the Related Art

A cathode ray tube (CRT) has been widely accepted as an information display device and includes advantages, such as a good display performance and a low unit price. However, the CRT also has disadvantages, such as poor portability due to its bulky size and heavy weight. Accordingly, various types of liquid crystal display (LCD) devices were developed in recent years. The LCD devices include features that can overcome the disadvantages of the CRT, for example, increased portability due to light weight and slim size, and low power consumption. These features are implemented in most LCD devices and are replacing the CRT rapidly.

FIG. 1 is a perspective view of a related art LCD device, and FIG. 2 is a partial sectional view of the related art LCD device. As shown in FIGS. 1 and 2, the related art LCD device includes a liquid crystal panel 3 displaying an image, a backlight unit 20 illuminating a plane light onto the liquid crystal panel 3, a lower cover 9 receiving the backlight unit 20, a panel guide 5 securing the liquid crystal panel 3 in place, and a top case 1 coupled to the lower cover 9.

As shown in FIG. 2, the liquid crystal panel 3 includes a thin film transistor (TFT) substrate 3b on which a pixel electrode and a TFT are formed, and a color filter substrate 3a on which a color filter layer is formed. The TFT substrate 3b and the color filter substrate 3a are attached with a liquid crystal layer (not shown) interposed therebetween. An upper polarizing plate 11a and a lower polarizing plate 11b are respectively attached on outer surfaces of the liquid crystal panel 3.

The backlight unit 20 includes a light guide plate 15, a lamp 13, optical sheets 21 and a reflection sheet 18 provided inside the lower cover 9. In the related art LCD device having the above described structure, a folded edge of the reflection sheet 18 secures the lamp 13 in place. The lamp 13 can be disposed around all four sides of the liquid crystal panel 3 or only at two sides of the panel. Light generated from the lamp 13 is incident on a sidewall of the light guide plate 15. The incident light is converted into a plane light source, and then supplied to the liquid crystal panel 3.

After the liquid crystal panel 3 is assembled with the backlight unit 20, a top case 1 is coupled to cover the liquid crystal panel 3. In FIG. 2, reference numeral 17 indicates a support pad supporting the top case 1. However, the related art LCD device is required to use an independently manufactured panel guide 5 in order to assemble the liquid crystal panel 3 after the backlight unit 20 is sequentially received inside the lower cover 9. Accordingly, the assembly processes become complicated. In addition, the panel guide 5 contributes to achieving the slim size of the LCD device, thus the panel guide 5 needs to be manufactured as an independent component. Hence, the manufacturing cost of the LCD device increases.

SUMMARY OF THE INVENTION

Accordingly, the present invention is directed to an LCD device and method of assembling the same that substantially obviates one or more problems due to limitations and disadvantages of the related art.

An object of the present invention is to provide an LCD device and method of assembling the same that enhances the device assembly process, in particular, achieving a slim profile and decreasing the manufacturing costs, by forming a main support that can serve as a panel guide and lower cover.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described, a liquid crystal display device includes a liquid crystal panel; a backlight unit to provide a light to the liquid crystal panel, the backlight unit includes an optical sheet and a light guide plate; and a main support to receive the liquid crystal panel and the backlight unit together, the main support having first and second movement preventing members to prevent shifting of the optical sheet and the light guide plate of the backlight unit in a direction on a plane, and a third movement preventing member to prevent shifting of the light guide plate of the backlight unit in a direction normal to the plane.

In another aspect, a method of assembling a liquid crystal display device includes providing a main support having first to third movement preventing members; coupling a light guide plate on a reflection sheet in the main support; and assembling a liquid crystal panel on the light guide plate in the main support.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will be made in detail to the preferred embodiments of the present invention, examples of which are illustrated in the accompanying drawings.

Figure 1:
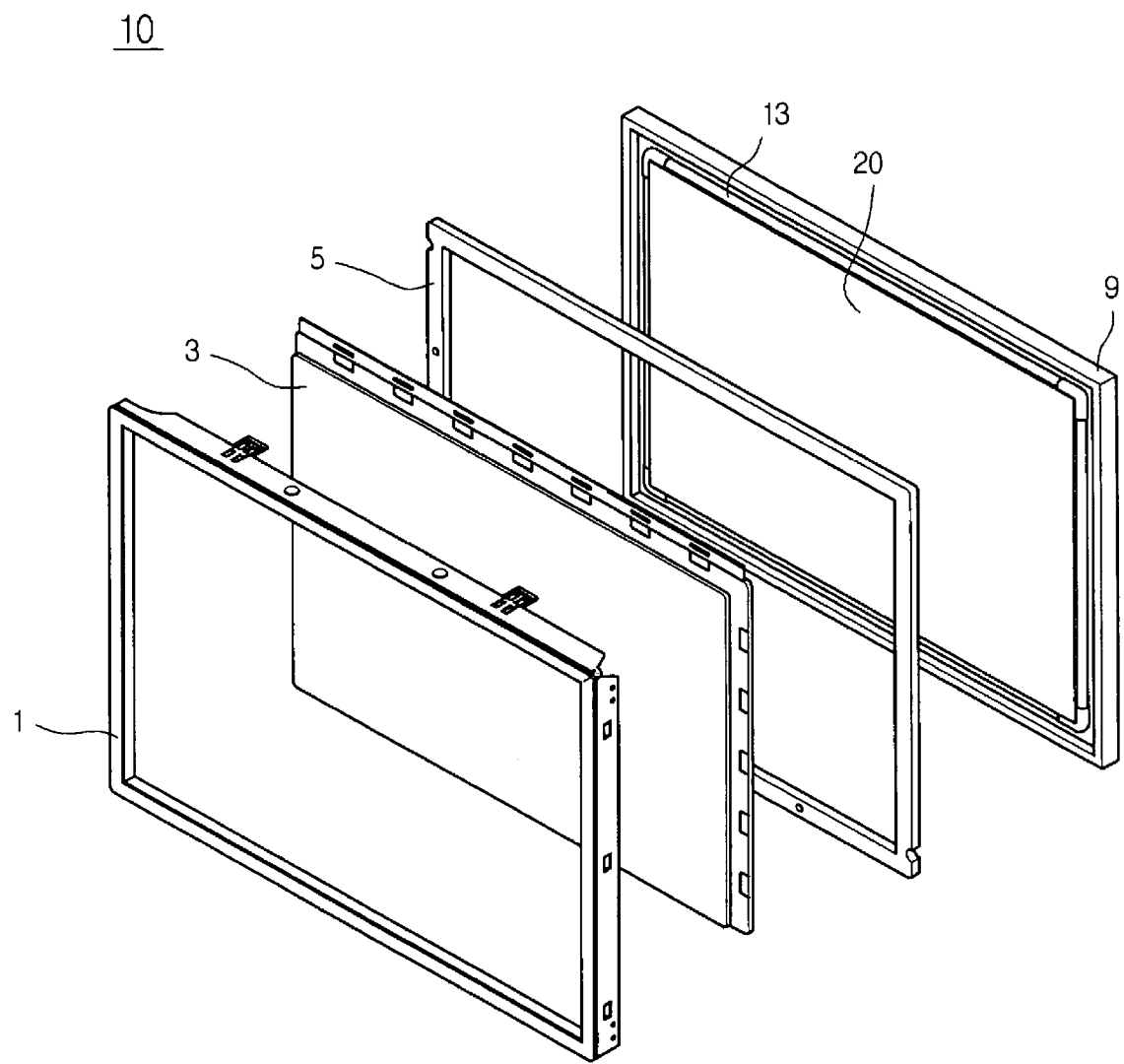
FIG. 1 is a perspective view of a related art LCD device.
Figure 2:
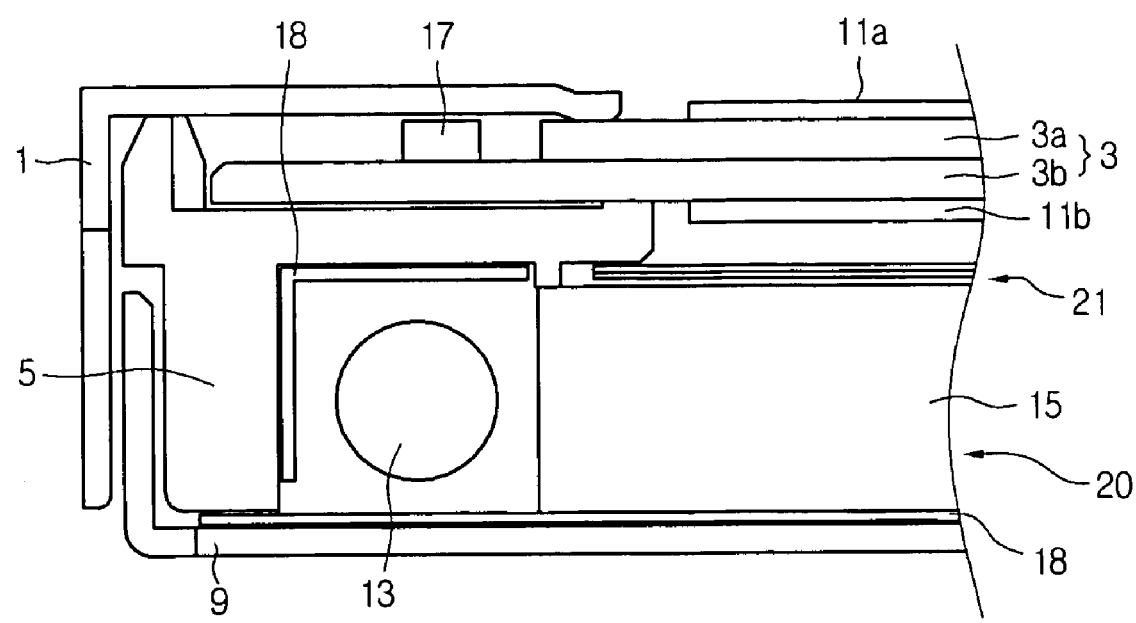
FIG. 2 is a partial sectional view of the related art LCD device.
Figure 3:
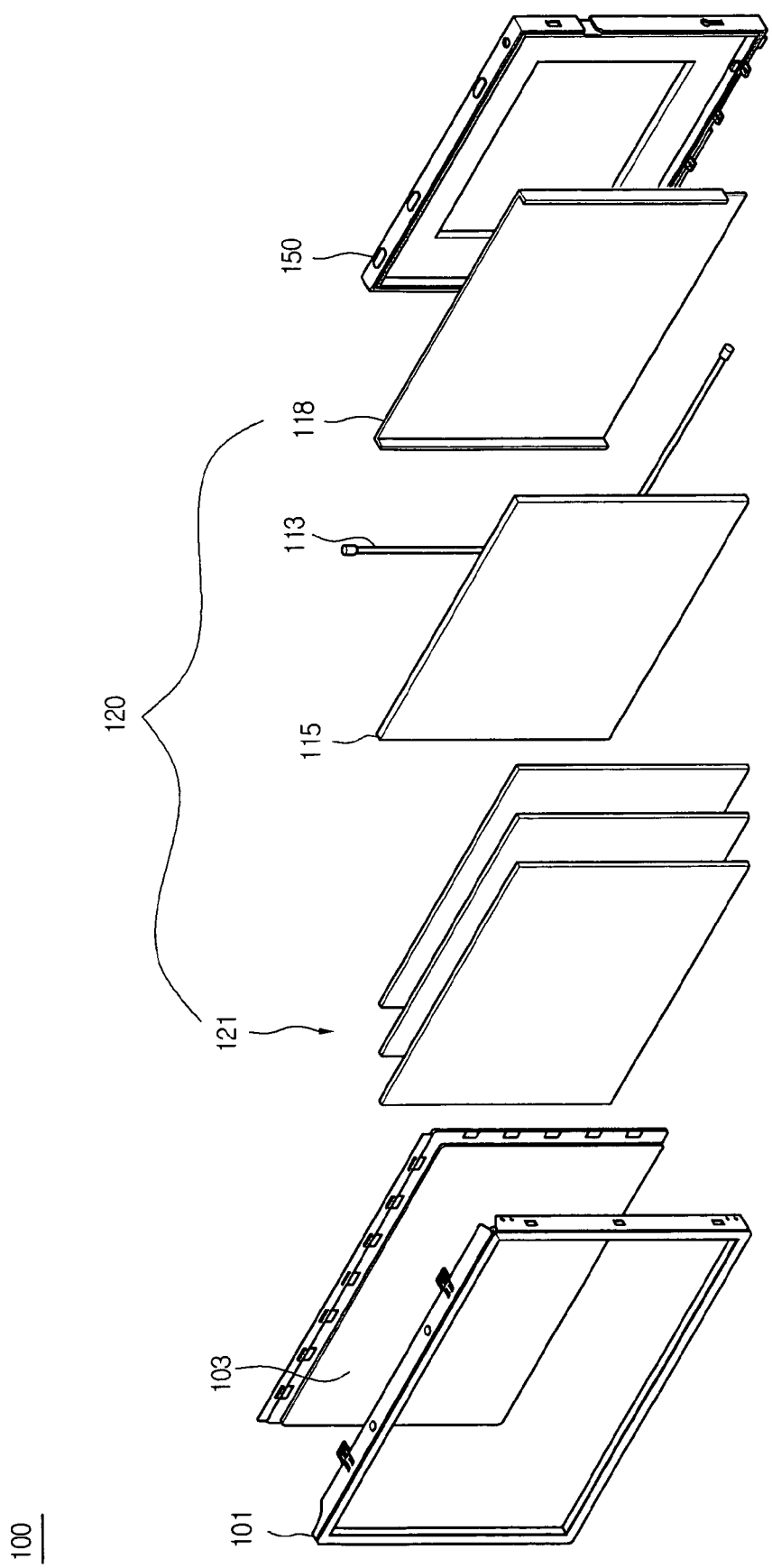
FIG. 3 is a perspective view of an exemplary LCD device according to an exemplary embodiment of the present invention.

FIG. 3 is a perspective view of an exemplary LCD device according to an exemplary embodiment of the present invention. As shown in FIG. 3, the exemplary LCD device 100 includes a liquid crystal panel 103, a backlight unit 120 supplying a plane light onto the liquid crystal panel 103, a main support 150 receiving the liquid crystal panel 103 and the backlight unit 120, and a top case 101 covering the liquid crystal panel 103 and the backlight unit 120. The backlight unit 120 includes optical sheets 121, a light guide plate 115, a lamp 113, and a reflection sheet 118.

The main support 150 is designed to receive and secure the liquid crystal panel 103 in place. In addition, the main support 150 has regions that secure the lamp 113 and the light guide plate 115 together. In this construction, an assembly process of the exemplary LCD device can be completed by receiving the liquid crystal panel 103 and the backlight unit 120 inside the main support 150 and then directly coupling the top case 101. Further, since the present invention does not need an additional panel guide to secure the liquid crystal panel 103, a total manufacturing cost is minimized.

Figure 4:
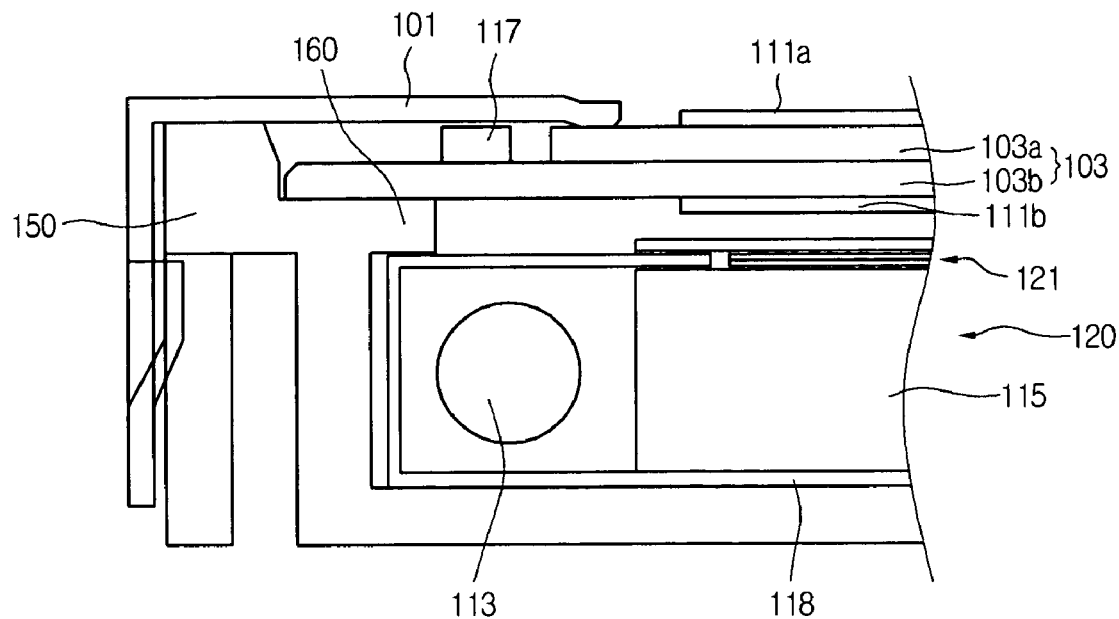
FIG. 4 is a partial sectional view of the exemplary LCD device according to the exemplary embodiment of the present invention.

A process of assembling the liquid crystal panel 103 and the backlight unit 120 inside the main support 150 will be described in detail with reference to the accompanying drawings. FIG. 4 is a partial sectional view of the exemplary LCD device. As shown in FIG. 4, the backlight unit 120 and the liquid crystal panel 103 are received together inside the main support 150, and the top case 101 and the main support 150 are coupled to each other simultaneously to fix the liquid crystal panel 103 and the backlight unit 120.

A side portion of the main support 150 receives the folded portions of the reflection sheet 118. The folded portions of the reflection sheet 118 secure the lamp 113 in place. In addition, the side portion of the main support 150 includes a plurality of side protruded parts 160 that secures the lamp 113 in place. Accordingly, the lamp 113 is easily assembled in the main support 150. The plurality of side protruded parts 160 can be formed either continuously or discontinuously.

After the reflection sheet 118 and the lamp 113 are assembled together, a light guide plate 115 is coupled on a center portion of the main support 150. Then, a plurality of optical sheets 121 are assembled on the light guide plate 115. After the backlight unit 120 is assembled inside the main support 150 as described above, the liquid crystal panel 103 is assembled on the main support 150, and then the top case 101 is coupled together. In FIG. 4, a reference numeral 117 indicates a support pad to prevent the top case 101 from being twisted. Since the main support 150 performs both as the panel guide to secure the liquid crystal panel 103 and as the lower cover to receive the backlight unit 120, it is formed using a polycarbonate material instead of using a press mold.

The liquid crystal panel 103 includes a color filter substrate 103a on which a color filter layer is formed and a thin film transistor (TFT) substrate 103b on which a pixel electrode and a TFT are formed. The color filter substrate 103a and the TFT substrate 103b are attached with a liquid crystal layer (not shown) interposed therebetween. An upper polarizing plate 111a is attached on an outer surface of the color filter substrate 103a and a lower polarizing plate 111b is attached on an outer surface of the TFT substrate 103b.

Figure 5:
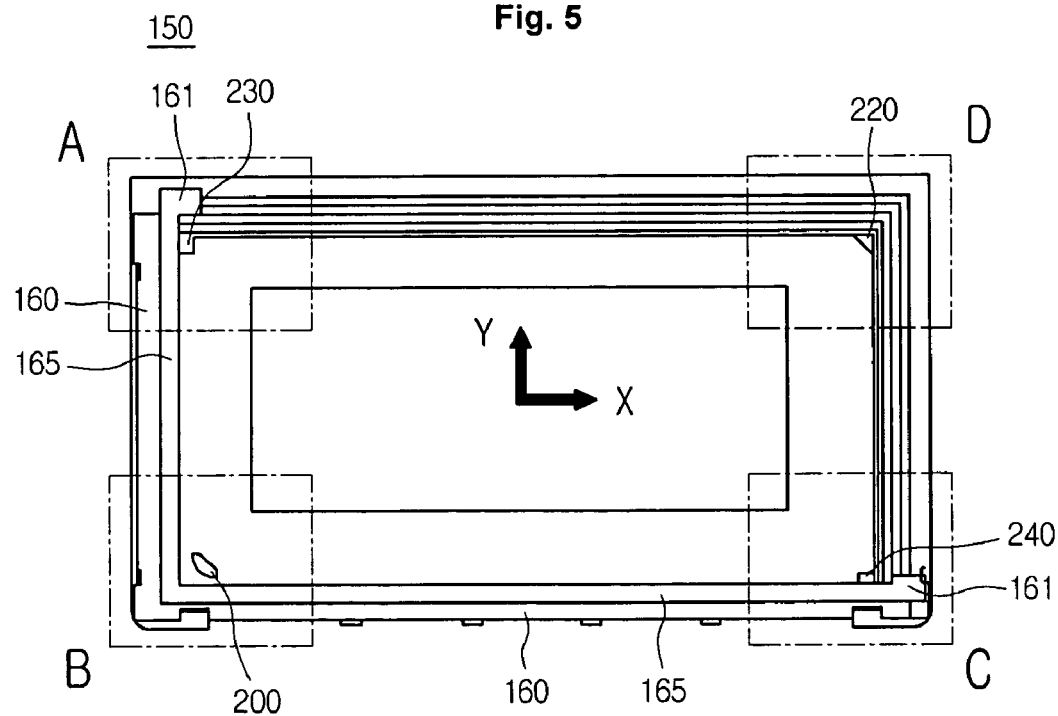
FIG. 5 is a plane view of an exemplary main support according to the exemplary embodiment of the present invention.

FIG. 5 is a plane view of an exemplary main support, and FIGS. 6A to 6D details the regions A, B, C and D of FIG. 5. The detailed description of the main support 150 will be explained with reference to FIGS. 5 and 6A to 6D. The exemplary main support 150 has a lamp coupling groove 165 for coupling the lamp along an inner edge thereof. The lamp coupling groove 165 can be formed along all edges or some edges of the main support 150 depending on the number of lamps assembled in the main support 150.

For example, when four lamps are coupled in the main support 150, the lamp coupling groove 165 can be formed at four edges of the main support 150. When two lamps are coupled, the lamp coupling groove 165 can be formed at desired two edges of the main support 150. Accordingly, the number of lamp coupling grooves 165 formed inside the main support 150 corresponds to the number of the lamps to be coupled. The lamp coupling groove 165 can be formed continuously from one edge to an adjacent edge or discontinuously (i.e., edges that are separated from each) depending on the number and the desired locations of the lamps.

The lamp coupling groove 165 includes cable connecting grooves 161 in a '¬', shape at the ends of the lamp coupling groove 165. The cable connecting grooves 161 secure spaces to connect the lamp(s) with a power cable (not shown). In addition, the cable connecting grooves 161 prevent disengaging of the lamp from the lamp coupling groove 165 while the lamp is coupled with the reflection sheet 118 (FIG. 4). Further, a plurality of the side protruded part 160 is formed parallel to the lamp coupling groove 165 such that the reflection sheet 118 and the lamp 113 are coupled easily. In the above described structure, the lamp 113 is introduced obliquely and assembled at the edge portions of the reflection sheet 118 and the main support 150.

As shown in FIG. 5 and FIGS. 6A to 6D, the main support 150 has a first movement preventing member 200, a second movement preventing members 230, 240, and a third movement preventing member 220. All three preventing members are formed at inside corners of the main support 150. The first movement preventing member 200 and the second movement preventing members 230, 240 are used to prevent shifting of the light guide plate 115, assembled in the main support 150, in any direction on a X-Y plane. The third movement preventing member 220 prevents shifting of the light guide plate 115 in a Z-axis direction (i.e., normal to the light guide plate 115).

Figure 6A:
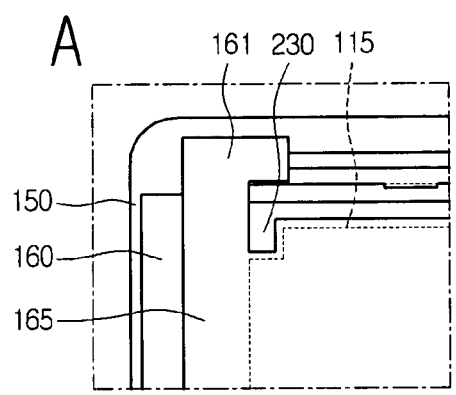
FIGS. 6A to 6D are views detailing the regions A, B, C and D of FIG. 5.
Figure 6B:
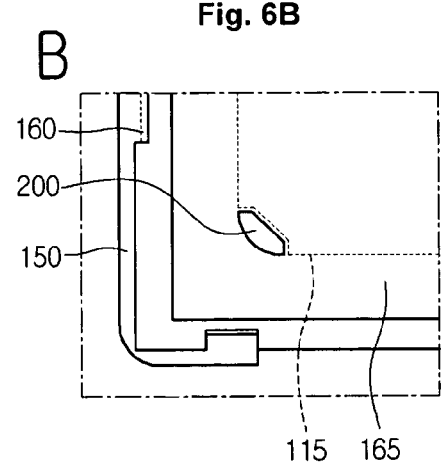
Figure 6C:
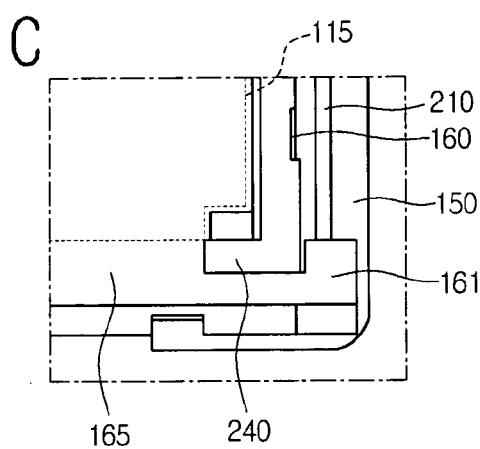
Figure 6D:
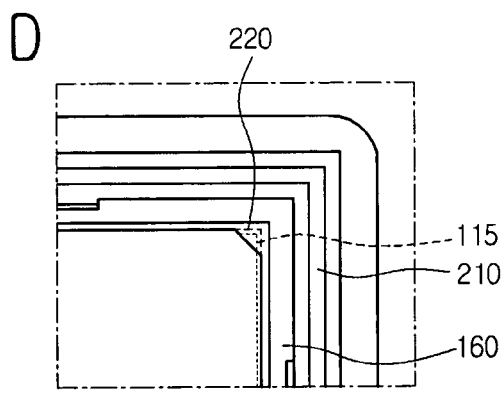

Accordingly, corners of the light guide plate 115 are patterned to correspond to the first movement preventing member 200 and the second movement preventing members 230, 240. In particular, as shown in FIG. 6B, the first movement preventing member 200 is formed in a streamline shape at an outer side surface where it contacts the lamp coupling groove 165. And, an inner side surface of the first movement preventing member 200 contacts one corner of the light guide plate 115.

When the lamp(s) are coupled to all four corners of the main support 150 (not shown in FIGS. 5, and 6A to 6D), the first movement preventing member 200, the second movement preventing members 230, 240 and the third movement preventing member 220 are formed in desired shapes at portions contacting the lamp coupling groove 165. The main support 150 serves as the panel guide to fix the liquid crystal panel 103 in place, at the same time, the movement preventing members formed at respective corners of the main support 150 prevent shifting of the light guide plate 115 in unwanted directions.

Figure 7:
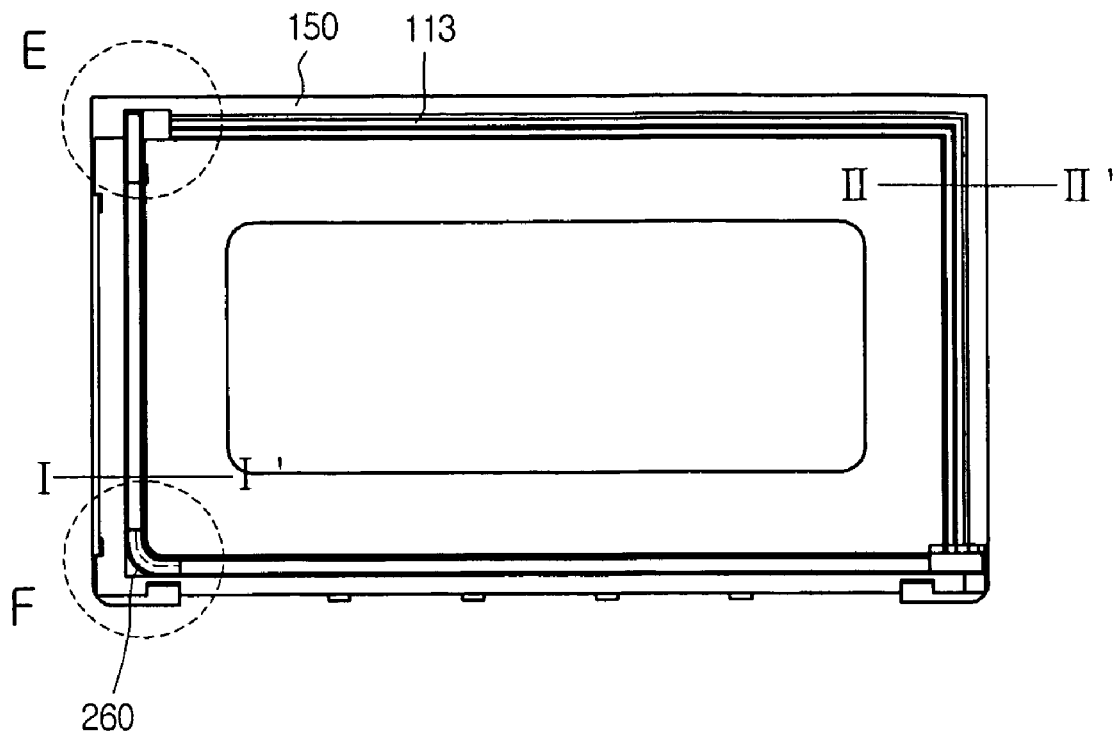
FIG. 7 is a plane view showing an exemplary coupling structure where a lamp is coupled to a main support according to the exemplary embodiment of the present invention.
Figure 8:
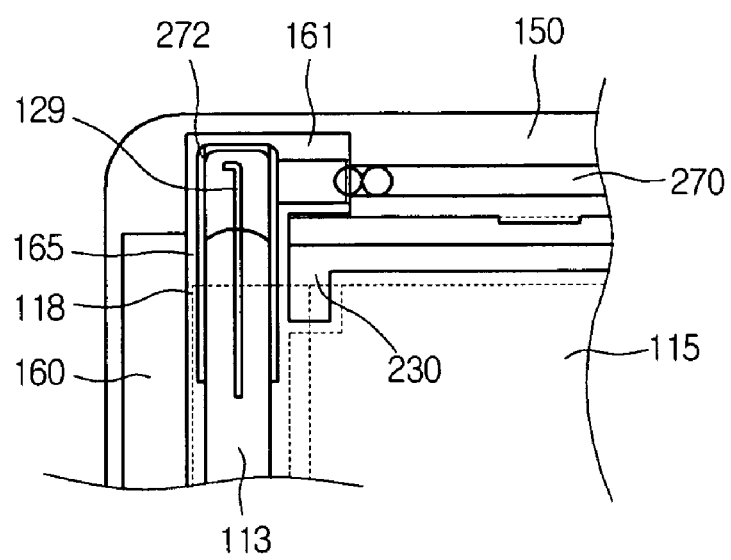
FIG. 8 is a view detailing the region E of FIG. 7.
Figure 9:
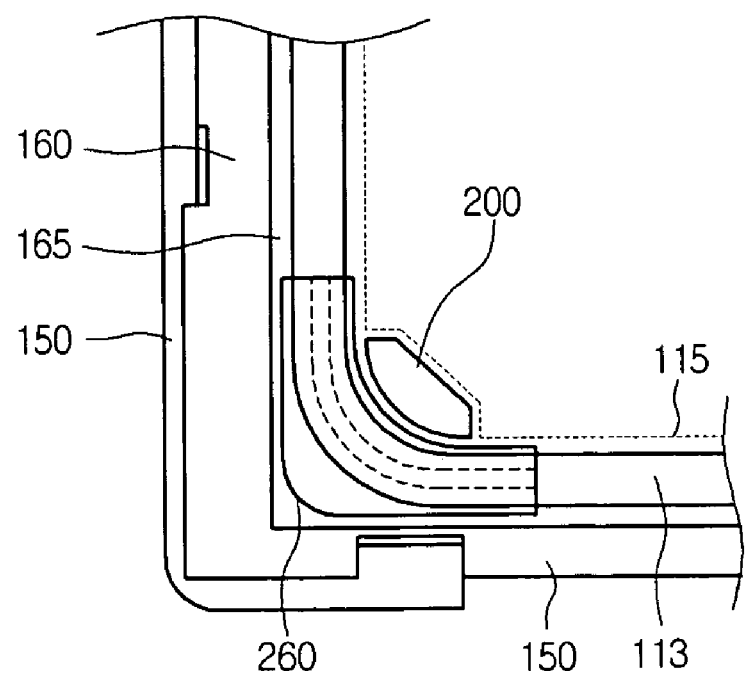
FIG. 9 is a view detailing the region F of FIG. 7.

FIG. 7 is a plane view showing an exemplary coupling structure where a lamp is coupled to a main support according to the exemplary embodiment of the present invention. FIG. 8 is a view detailing the region E of FIG. 7, and FIG. 9 is a view detailing the region F of FIG. 7. As shown in FIGS. 7, 8 and 9, a lamp 113 is coupled within the lamp coupling groove 165 formed at an edge of the main support 150, a ground part 272 is formed at an end portion of the lamp 113, and the lamp 113 is electrically connected with a cable 270.

As shown FIG. 8, the ground part 272 is positioned in the cable connecting groove 161. One end terminal 129 of the lamp 113 and the cable 270 are electrically connected with each other. The second movement preventing member 230 formed in the cable connecting groove 161 contacts and is coupled with one corner of the light guide plate 115. The second movement preventing member 230 prevents shifting of the light guide plate 115 in a horizontal direction. The lamp 113 is enclosed by the reflection sheet 118 and assembled in the lamp coupling groove 165. Furthermore, an edge of the reflection sheet 118 is assembled next to the side protruded part 160.

Next, as shown in FIG. 9, the first movement preventing member 200 formed in the main support 150 has an inner side surface contacting one corner of the light guide plate 115. The first movement preventing member 200 prevents shifting of the light guide plate 115 in a horizontal direction. And, an outer side surface contacts a lamp connecting part 260. The lamp connecting part 260 allows the lamp 113 be coupled to the corner of the main support 150 without any damage.

Figure 10:
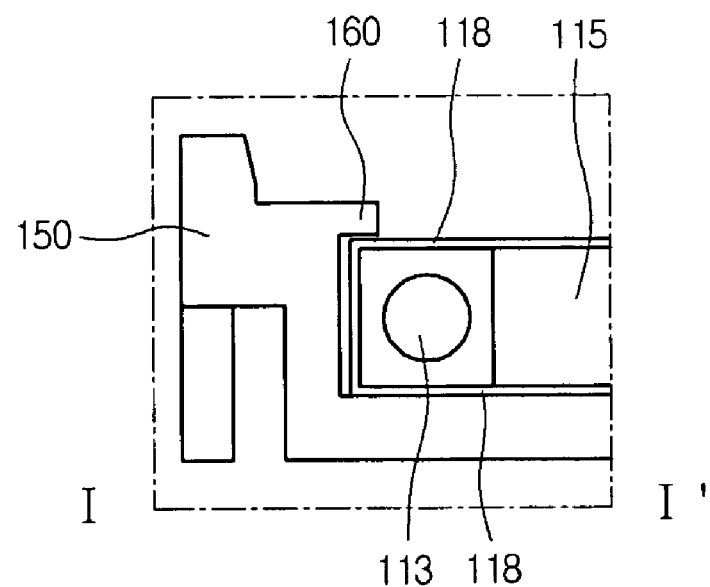
FIG. 10 is a sectional view taken along line I-I' of FIG. 7.
Figure 11:
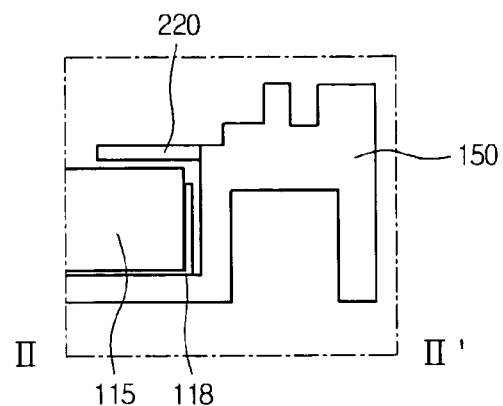
FIG. 11 is a sectional view taken along line II-II' of FIG. 7.

FIG. 10 is a sectional view taken along line I-I' of FIG. 7 and FIG. 11 is a sectional view taken along line II-II' of FIG. 7. As shown in FIGS. 10 and 11, the reflection sheet 118 secures the lamp 113 in the main support 150 by wrapping the lamp 113. The reflection sheet 118 is formed in a 'ㄷ'shape at a portion wrapping the lamp 113. By doing so, the light generated from the lamp 113 is reflected by the reflection sheet 118 and then progressed toward the light guide plate 115, thus preventing light leakage. The light guide plate 115 is disposed on the light reflection sheet 118. The side protruded part 160 is formed at an edge portion of the main support 150 facing the light reflection sheet 118 and secures the light reflection sheet 118, the lamp 113, and the light guide plate 115.

In addition, as shown in FIG. 11, the light guide plate 115 is disposed on the reflection sheet 118 at the corner of the main support 150 where the third movement preventing member 220 is formed. The third movement preventing member 220 prevents shifting of the light guide plate 115 in the vertical direction. Accordingly, the exemplary main support can prevent the shifting of the light guide plate in the vertical and/or the horizontal direction.

Figure 12:
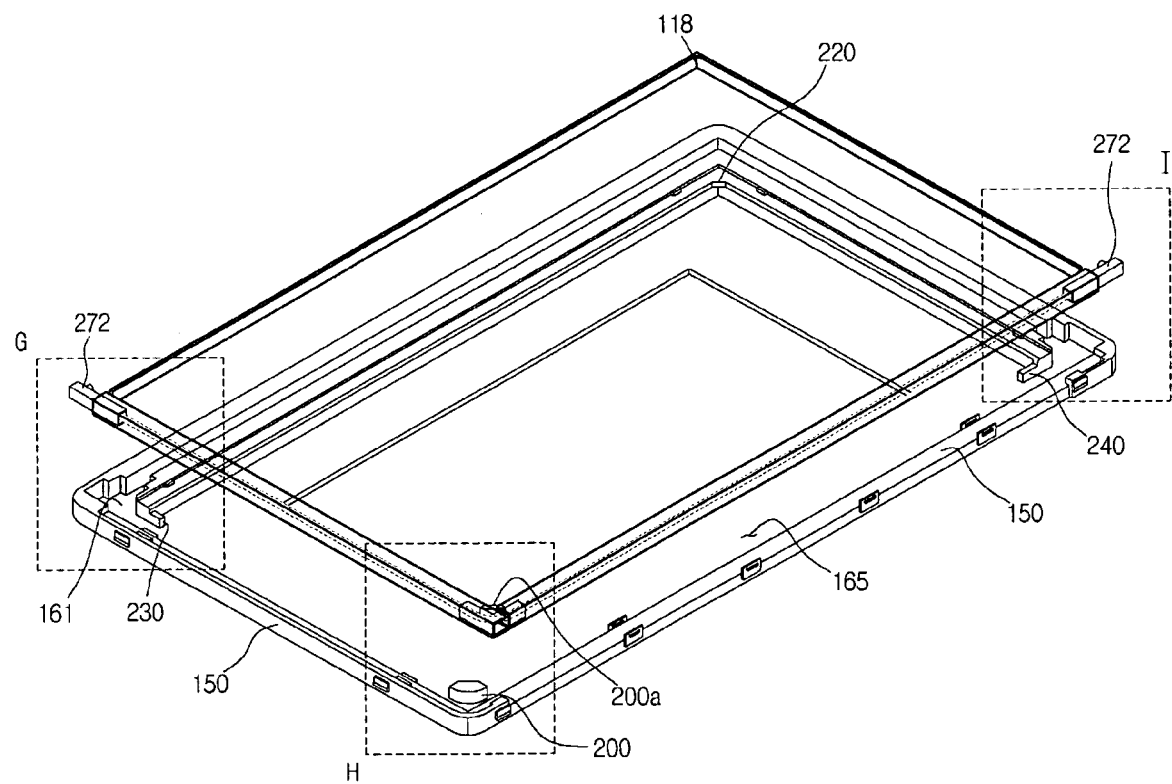
FIG. 12 is a perspective view showing an exemplary assemblage of a lamp, a reflection sheet, and the main support according to the exemplary embodiment of the present invention.
Figure 13:
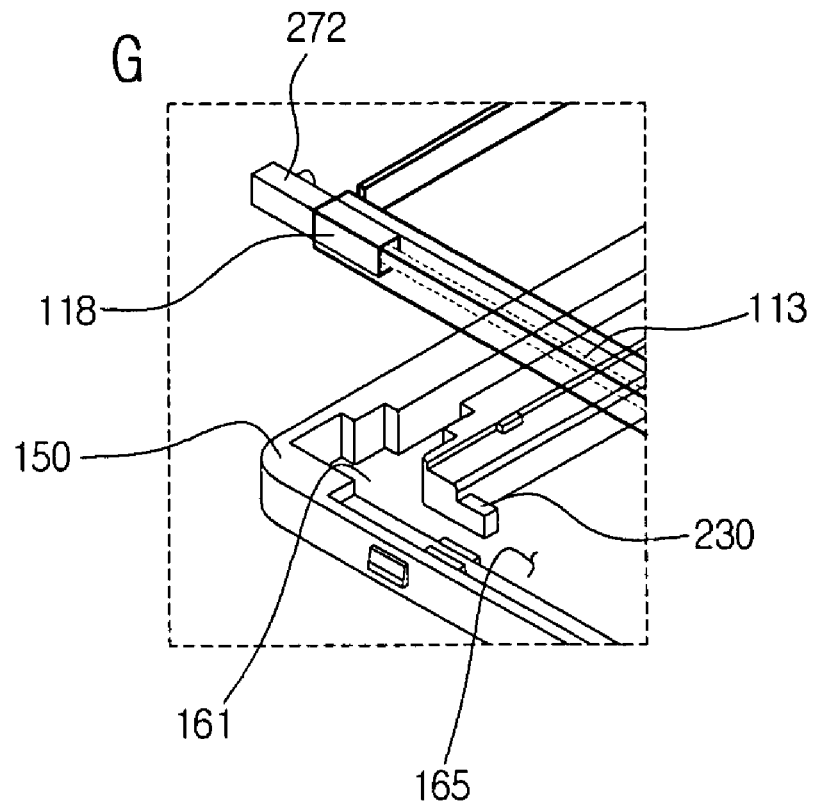
FIGS. 13 to 15 are views detailing the region G, H and I of FIG. 12.
Figure 14:
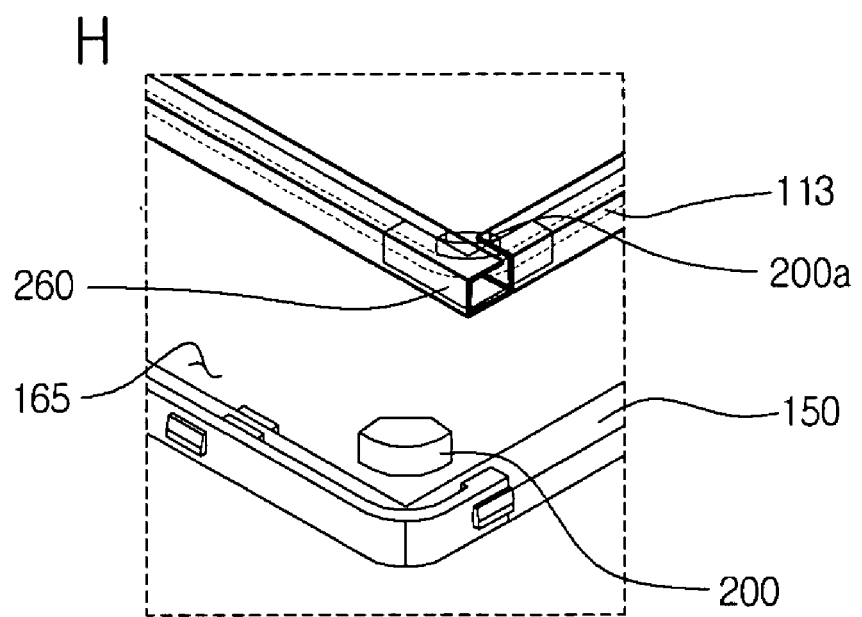
Figure 15:
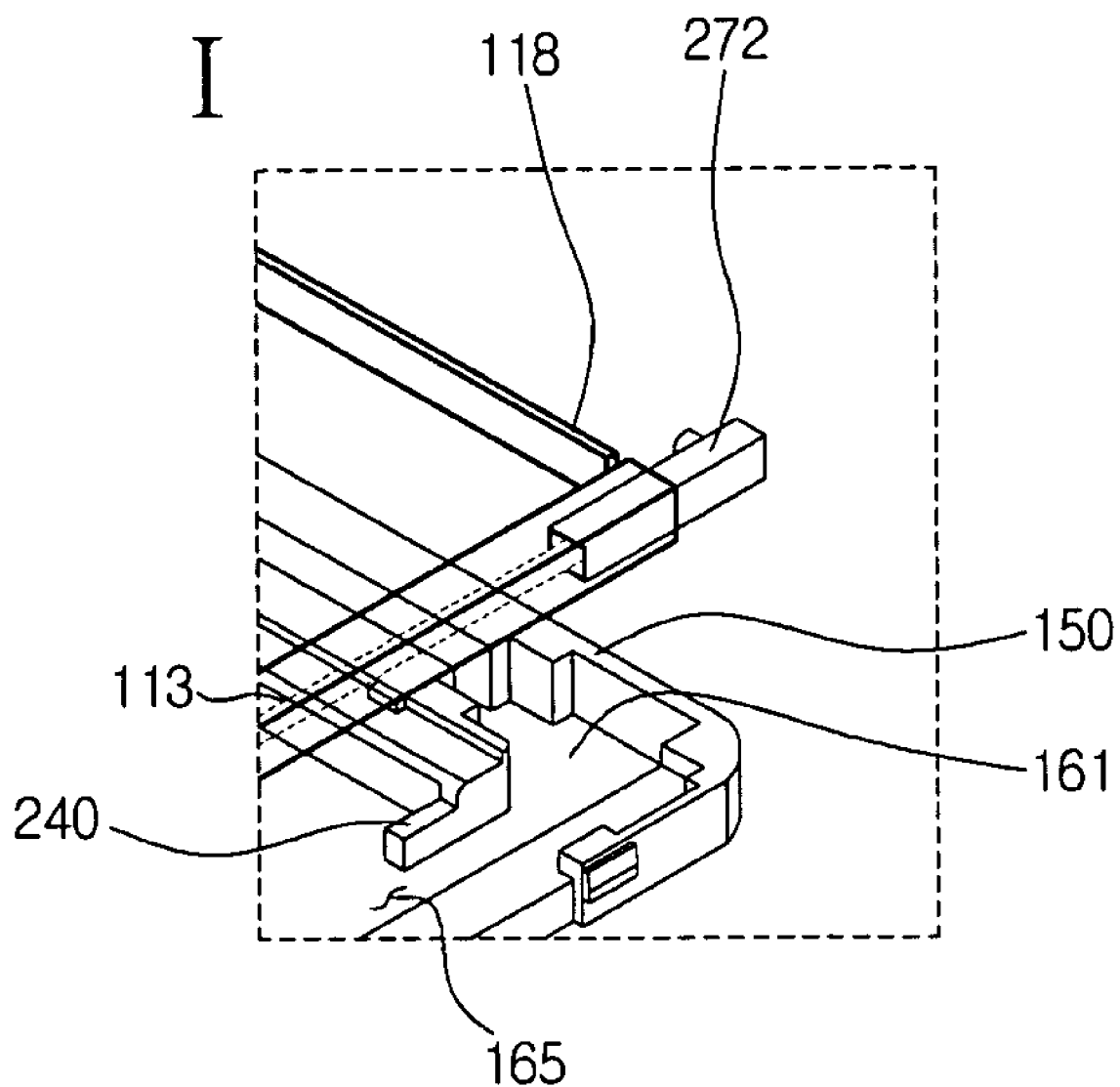

FIG. 12 is a perspective view showing an exemplary assemblage of a lamp, a reflection sheet, and the main support according to the exemplary embodiment of the present invention. And, FIGS. 13 through 15 are views detailing the region G, H and I of FIG. 12. As shown in FIG. 12 and FIGS. 13 through 15, the 'L-shaped' lamp 113 is enclosed by the reflection sheet 118 and is coupled to the main support 150. While FIGS. 12 to 15 show an example of the 'L-shaped' lamp 113, the present invention can be also applied to the 'ㄷ'- or '□'-shaped lamps.

As shown in FIGS. 13 and 15, ground part 272 for connecting the power terminal of the lamp with the cable is disposed at both edges of the lamp 113. A conductive paste (not shown) is disposed in the ground part 272 allowing the lamp 113 and the cable to be electrically connected with each other by coupling a terminal of the cable with a terminal of the lamp. The first movement preventing member 200, the second movement preventing members 230, 240 and the third movement preventing member 220 are formed at four inner corners of the main support 150. The cable connecting grooves 161 are also formed at respective inner corners of the main support 150 to receive both the ground part 272 and the lamp 113.

The lamp coupling groove 165 is formed at respective edges of the main support 150 thereby securing a space to assemble the lamp 113. Further, since the first movement preventing member 200 has its outer side surface contacting the lamp connecting part 260 and the inner side surface to support the light guide plate 115, a hole 200a is formed in the reflection sheet 118 (shown in FIGS. 12 and 14). Accordingly, the first movement preventing member 200 can be coupled with the reflection sheet 118 through the hole 200a.

As shown in FIG. 13, the ground part 272 is assembled in a main support 150 at a portion corresponding to the cable connecting groove 161 and the lamp 113 is assembled in the lamp coupling groove 165 (region G). As shown in FIG. 14, the lamp connecting part 260 is assembled between the corner of the main support 150 and the first movement preventing member 200. The first movement preventing member 200 is inserted through the hole 200a formed in the reflection sheet 118 and protrudes in a normal direction from the reflection sheet 118 to support the light guide plate 115 (region H). As shown in FIG. 15, the ground part 272 disposed at the end portion of the lamp 113 is assembled in the cable connecting groove 161 and the second movement preventing member 240 formed in the cable connecting groove 161 region supports the light guide plate 115 (region I). Similar to the lamp 113 shown in region G, the lamp 113 in region I is assembled in the lamp coupling groove 165 formed in the main support 150.

As described above, the exemplary embodiments of the present invention provide a new main support structure that serve as the panel guide while fixing the liquid crystal panel in the liquid crystal display device and also serves as the lower cover of the liquid crystal display device. Accordingly, simplifying the total assembling processes of the liquid crystal display device, thereby reducing the production costs.

It will be apparent to those skilled in the art that various modifications and variations can be made in the liquid crystal display device and method of assembling the same of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a liquid crystal panel;
a backlight unit to provide a light to the liquid crystal panel, the backlight unit includes an optical sheet and a light guide plate;
a main support to receive the liquid crystal panel and the backlight unit together, the main support having first and second movement preventing members to prevent shifting of the optical sheet and the light guide plate of the backlight unit in a direction on a plane, and a third movement preventing member to prevent shifting of the light guide plate of the backlight unit in a direction normal to the plane,
wherein the first, second, and the third movement preventing members are formed at respective inner corners of the main support,
wherein the third movement preventing member is formed of a protrusion on inner sides of the main support corresponding to the edge of the light guide plate such that the protrusion forms a slot, a portion of the light guide plate being inserted into the slot,
wherein the protrusion of the third movement preventing member is parallel to the upper surface of the light guide plate, and
wherein the third movement preventing member and the edge of the light guide plate overlap each other.

2. The liquid crystal display device according to claim 1, wherein the backlight unit further includes a reflection sheet.

3. The liquid crystal display device according to claim 1, wherein any one of the first and second movement preventing members supports a portion of the lamp where lamp is bent or connected to a ground.

4. The liquid crystal display device according to claim 1, wherein the lamp is disposed inside the main support along a circumference of the main support, and formed in one of L-shape, 'ᄃ'-shape, and ☐-shape.

5. The liquid crystal display device according to claim 1, wherein a lamp coupling groove is formed inside the main support along a circumference of the main support, such that the lamp is assembled in the lamp coupling groove.

6. The liquid crystal display device according to claim 5, wherein the lamp coupling groove comprises a cable connecting groove formed at respective edge thereof to connect the lamp with a cable.

7. The liquid crystal display device according to claim 1, wherein the main support further comprises a side protruded part to fix the reflection sheet of the backlight unit, such that a portion of the main support extends inwardly from an edge portion of the main support to form the side protruded part.

8. The liquid crystal display device according to claim 7, wherein the side protruded part is formed corresponding to a location of the lamp.

9. The liquid crystal display device according to claim 1, wherein the main support is formed of polycarbonate material.

* * * * *